(12) United States Patent
Krumel et al.

(10) Patent No.: US 8,515,762 B2
(45) Date of Patent: Aug. 20, 2013

(54) MARKUP LANGUAGE-BASED SELECTION AND UTILIZATION OF RECOGNIZERS FOR UTTERANCE PROCESSING

(75) Inventors: Andrew K. Krumel, Redmond, WA (US); Pierre-Alexandre F. Masse, Redmond, WA (US); Joseph A. Ruff, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1005 days.

(21) Appl. No.: 12/357,773

(22) Filed: Jan. 22, 2009

(65) Prior Publication Data

US 2010/0185447 A1    Jul. 22, 2010

(51) Int. Cl.
    *G10L 21/00*    (2006.01)
(52) U.S. Cl.
    USPC .............. 704/270.1; 715/201; 706/46; 704/9; 704/260; 704/251; 455/557; 382/218; 379/265.02; 370/352; 345/530
(58) Field of Classification Search
    USPC ............ 370/352; 704/270.1, 9, 260, 251; 715/201; 706/46; 455/557; 382/218; 379/265.02; 345/530
    See application file for complete search history.

(56) References Cited

U.S. PATENT DOCUMENTS

| | | | | |
|---|---|---|---|---|
| 5,251,131 A * | 10/1993 | Masand et al. | | 704/9 |
| 5,819,220 A * | 10/1998 | Sarukkai et al. | | 704/270.1 |
| 6,757,655 B1 * | 6/2004 | Besling et al. | | 704/270.1 |
| 6,999,930 B1 * | 2/2006 | Roberts et al. | | 704/270.1 |
| 7,382,770 B2 * | 6/2008 | Bergman et al. | | 370/352 |
| 7,409,349 B2 * | 8/2008 | Wang et al. | | 704/270.1 |
| 7,865,362 B2 * | 1/2011 | Braho et al. | | 704/251 |
| 8,374,983 B1 * | 2/2013 | Pohl et al. | | 706/46 |
| 2003/0221158 A1 * | 11/2003 | Ativanichayaphong et al. | | 715/500 |
| 2004/0107107 A1 | 6/2004 | Lenir et al. | | |
| 2004/0192384 A1 * | 9/2004 | Anastasakos et al. | | 455/557 |
| 2005/0105712 A1 * | 5/2005 | Williams et al. | | 379/265.02 |
| 2005/0234727 A1 | 10/2005 | Chiu | | |
| 2006/0080105 A1 * | 4/2006 | Lee et al. | | 704/270.1 |
| 2006/0235694 A1 | 10/2006 | Cross et al. | | |

(Continued)

FOREIGN PATENT DOCUMENTS

| CN | 1343351 A | 4/2002 |
|---|---|---|
| JP | 2002-539480 | 11/2001 |
| JP | 2006-506758 | 2/2006 |
| KR | 10-2005-007742 A | 8/2005 |

OTHER PUBLICATIONS

Robert Brown: "Exploring New Speech Recognition and Synthesis APIs in Windows Vista"—Retrieved on Nov. 19, 2008, pp. 1-11. http://msdn.microsoft.com/en-us/magazine/cc163663.aspx.

(Continued)

*Primary Examiner* — Michael Colucci
(74) *Attorney, Agent, or Firm* — Merchant & Gould (57) ABSTRACT

Embodiments are provided for selecting and utilizing multiple recognizers to process an utterance based on a markup language document. The markup language document and an utterance are received in a computing device. One or more recognizers are selected from among the multiple recognizers for returning a results set for the utterance based on markup language in the markup language document. The results set is received from the one or more selected recognizers in a format determined by a processing method specified in the markup language document. An event is then executed on the computing device in response to receiving the results set.

13 Claims, 5 Drawing Sheets

(56) References Cited

U.S. PATENT DOCUMENTS

| | | | |
|---|---|---|---|
| 2007/0047719 A1 | 3/2007 | Dhawan et al. | |
| 2007/0061146 A1 | 3/2007 | Jaramillo et al. | |
| 2007/0118378 A1* | 5/2007 | Skuratovsky | 704/260 |
| 2007/0239453 A1 | 10/2007 | Paek et al. | |
| 2008/0208585 A1 | 8/2008 | Ativanichayaphong et al. | |
| 2009/0128573 A1* | 5/2009 | Lambe et al. | 345/530 |
| 2012/0314962 A1* | 12/2012 | Holland et al. | 382/218 |

OTHER PUBLICATIONS

IBM Contributes XML-based Speech Software to Apache and Eclipse Open Source Projects. Retrieved on Nov. 19, 2009, pp. 1-4. http://xml.coverpages.org/ni2004-09-14-a.html.

R.A. Frost et al.: "MySpeechWeb: Software to Facilitate the Construction and Deployment of Speech Applications on the Web". School of Computer Science, University of Windsor—Jun. 22, 2008, pp. 1-2. http://www.cs.uwindsor.ca/download/1818/SpeechWeb%20paper.pdf.

Rytis Maskeliunas et al.: "SALT—Markup Language for Speech-Enabled Web Pages". Issn.: 1392—124X Information Technology and Control, 2005, vol. 34, No. 2, pp. 145-152. http://itc.ktu.lt/itc342/Ratkev342.pdf.

International Search Report mailed Jun. 29, 2010 in PCT Application No. PCT/US2009/067788, pp. 1-10.

Chinese Second Office Action mailed Sep. 13, 2012 in Application No. 200980155360.6, 9 pages.

Japanese Notice of Rejection mailed Apr. 9, 2013 in Application No. 2011-547931, 4 pages.

* cited by examiner

MARKUP LANGUAGE-BASED SELECTION AND UTILIZATION OF RECOGNIZERS FOR UTTERANCE PROCESSING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Mobile computing devices utilize speech recognition technology to perform various voice-activated functions such as dialing and information queries. Due to the storage limits of mobile computing devices, in order to perform comprehensive speech recognition, multiple "recognizers" including local or device-based recognizers (for processing simple commands and simple queries) and network recognizers (for processing more complex queries such as those requiring access to online services) may be required. However, current mobile computing devices are restricted to processing queries using only a single recognizer or by using local and network recognizers in a serial fashion in which results must be processed by the local recognizer prior to being dispatched to the network recognizer for results processing. A drawback associated with only using a local recognizer is that results are limited to simple command and control requests (due to storage limitations). A drawback associated with only using a network recognizer is excessive latency for receiving results for simple command and control requests. A drawback with using local and network recognizers in a serial fashion is that the local recognizer must utilized prior to the network recognizer even when the local recognizer is unable to provide sufficient results processing. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for selecting and utilizing multiple recognizers to process an utterance based on a markup language document. The markup language document and an utterance are received in a computing device. One or more recognizers may be selected from among the multiple recognizers for returning a results set for the utterance based on markup language in the markup language document. The results set is received from the selected recognizer or recognizers in a format determined by a processing method specified in the markup language document. An event is then executed on the computing device in response to receiving the results set.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for selecting and utilizing multiple recognizers to process an utterance based on a markup language document. The markup language document and an utterance are received in a computing device. One or more recognizers may be selected from among the multiple recognizers for returning a results set for the utterance based on markup language in the markup language document. The results set is received from the selected recognizer or recognizers in a format determined by a processing method specified in the markup language document. An event is then executed on the computing device in response to receiving the results set.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
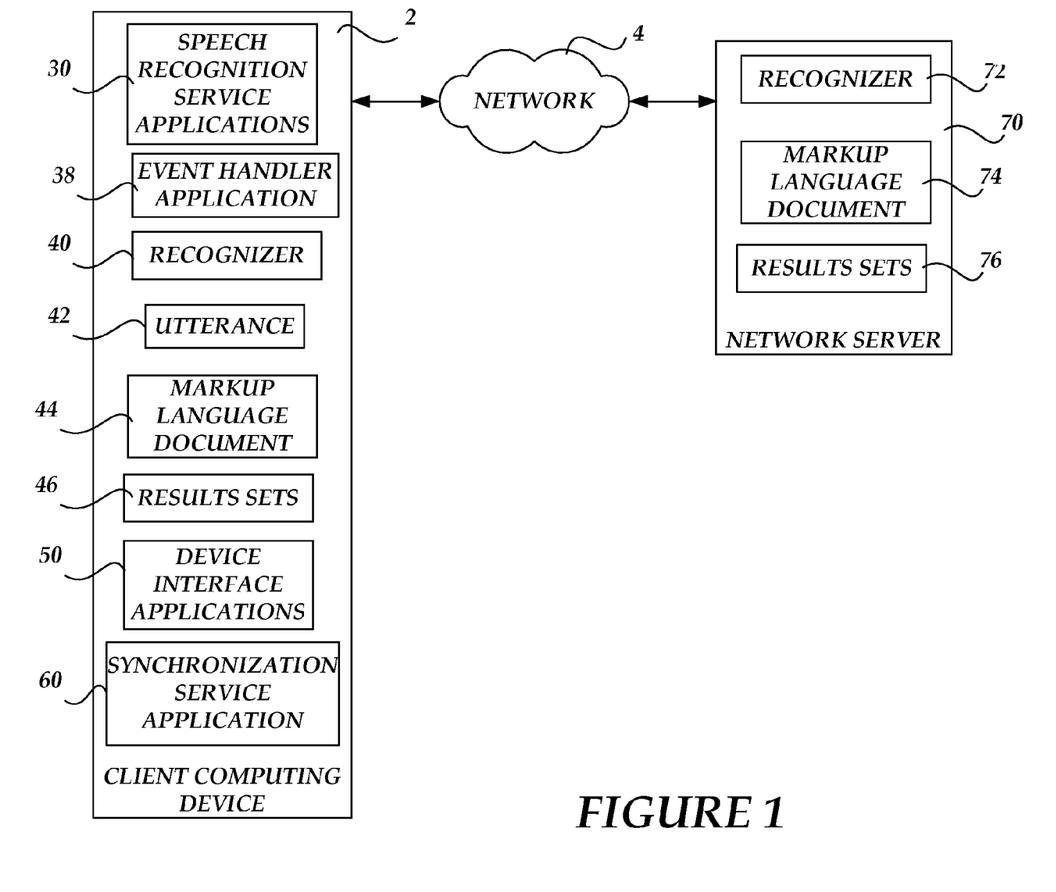
FIG. 1 is a block diagram illustrating a network architecture for selecting and utilizing multiple recognizers to process an utterance based on a markup language document, in accordance with various embodiments.

Referring now to the drawings, in which like numerals represent like elements through the several figures, various aspects of the present invention will be described. FIG. 1 is a block diagram illustrating a network architecture for selecting and utilizing multiple recognizers to process an utterance based on a markup language document, in accordance with various embodiments. The network architecture includes a client computing device 2 in communication with a network server 70 over a network 4. The client computing device 2 may include speech recognition server applications 30, an event handler application 38, a recognizer 40, an utterance 42, a markup language document 44, results sets 46, device interface applications 50 and synchronization service applications 60. It should be understood that in accordance with various embodiments, the recognizer 40 may comprise one or more recognizers. In accordance with various embodiments, the client computing device 2 may include a mobile or portable computer or other type of computer capable of executing one or more application programs including, but not limited to, a laptop computer, a "smartphone" (i.e., a mobile phone having computer functionality and/or which is capable of running operating system software to provide a standardized interface and platform for application developers), and an automobile-based computing device.

The speech recognition server applications 30 in the client computing device 2 may include various productivity software applications which may utilize speech recognition including, but not limited to, search engines (e.g., business search, stock quote search, sports scores, movie times, weather data, horoscopes, document search), navigation, voice activated dialing ("VAD"), automobile-based software (e.g., for turning a radio on or off, activating a cruise control function, temperature control, controlling video display functions, playing a "DVD"), device control functions (e.g., turning the client computing device 2 off, recording note, deleting/creating/moving files), messaging (e.g., text and MMS), media (e.g., taking a picture), and content. In accordance with various embodiments (which will be described in greater detail in the discussion of FIGS. 2-3), the event handler application 38 may be utilized to receive the utterance 42 from the client computing device 2 and process the utterance 42 for a grammar. It will be appreciated that the utterance 42 may comprise a command (such as dialing a contact from an address book) or a query for information by a user of the speech recognition service applications 30 on the client computing device 2. The event handler application 38 may further be utilized to parse the markup language document 44 for tags which specify a recognizer (i.e., the recognizer 40 or recognizer 72), based on the grammar used in the utterance 42, to return one or more results (i.e., one or more results sets 46 or results sets 76) in response to the utterance 42. In accordance with an embodiment, the recognizer 40 may comprise a separate application which may be executed on the client computing device 2 for processing results for the utterance 42. In accordance with another embodiment, the recognizer 40 may be embedded in an operating system of the client computing device 2.

The device interface applications 50 in the client computing device 2 may include application program interfaces ("APIs") for various functions which may performed by the client computing device 2 including, but not limited to, generating a user interface, networking, audio capture, speech recognition, audio playback, camera, address book, and global positioning system ("GPS") functions. The synchronization service application 60 in the client computing device 2 facilitates the synchronization of the client computing device 2 with the network server 70.

The client computing device 2 may communicate with the network server 70 over the network 4 which may include a local network or a wide area network (e.g., the Internet). The network server 70 may include the recognizer 72, a markup language document 74, and the results sets 76. It should be understood that in accordance with various embodiments, the recognizer 72 may comprise one or more recognizers. In accordance with an embodiment, the network server 70 may comprise a plurality of computing devices in a data center for receiving the utterance 42 from the client computing device 2 and for using the recognizer 72 (in response to a request from the event handler application 38) to determine and return the results sets 76 back to the client computing device 2 in response to the utterance 42.

In accordance with various embodiments, and as will be described in greater detail below with respect to FIG. 4, the markup language document 74 may comprise a version of the markup language document 44. The event handler application 38 may be configured to compare the markup language document 44 on the client computing device 2 with the markup language document 74, and if the markup language document 74 is an updated version (e.g., the markup language document 74 may include additional markup language for handling newly added features which may be utilized by the recognizer 40), then the markup language document 44 is updated with the additional markup language.

The plurality of computing devices (not shown) comprising the network server 70 may include, but are not limited to, an application gateway, an application server, a synchronization gateway and a recognition POD or replication device. It should be appreciated by those skilled in the art that communication between the plurality of computing devices comprising the network server 70 and the client computing device 2 may be facilitated by the use of a number of network protocols. For example, secure data communication between the client computing device 2 and the application gateway may be facilitated by the use of the transmission control protocol ("TCP") and the HyperText Transfer Protocol over Secure Socket Layer protocol ("HTTPS"). Communication between the application gateway, the application server, and the recognition POD may be facilitated by the use of the HyperText Transfer Protocol ("HTTP"). The aforementioned protocols are well-known to those skilled in the art and therefore are not discussed further herein. In accordance with an embodiment, the utterance 42 received by the network server 70 and the results sets 76 may be processed using the HTTP POST method (with audio) (e.g., by the application gateway prior to being sent to the recognition POD and the application server). The network server 70 (e.g., via the application server) may also convert the results sets 76 into a markup language document (i.e., a markup language document independent of the markup language documents 44 and 74) prior to communicating the results sets 76 to the client computing device 2 (in accordance with this embodiment, the event handler application 38 may include a markup language interpreter (not shown) for processing the markup language document comprising the results sets 76. In accordance with an embodiment, the results sets 76 may be compressed using one or more compression methods prior to being communicated to the client computing device 2. Examples of compression methods which may be utilized in various embodiments are the well-known Wireless Application Protocol Binary Extensible Markup Language ("WBXML") and GNU zip ("GZIP") compression methods.

Exemplary Operating Environment

Figure 2:
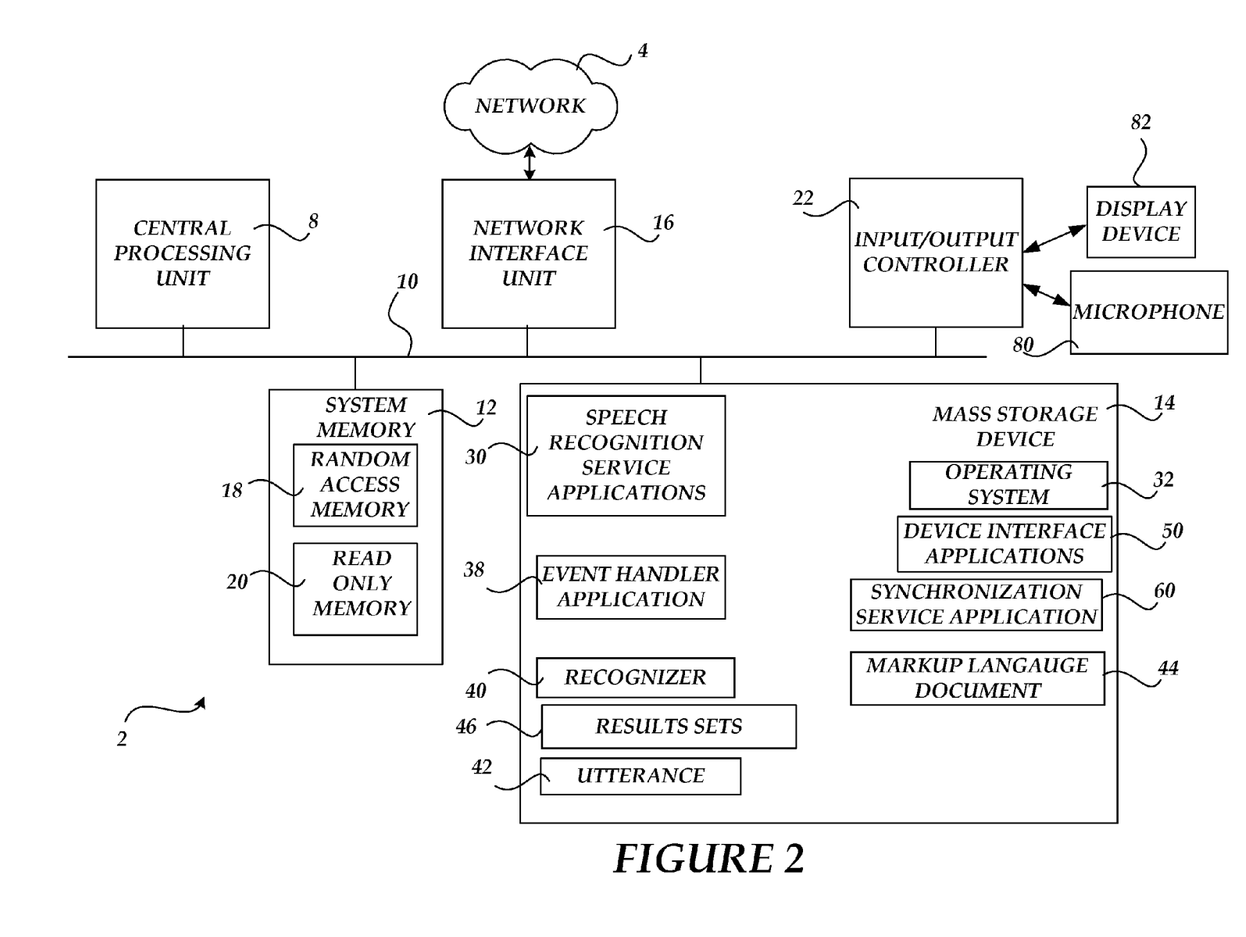
FIG. 2 is a block diagram illustrating a client computing environment which may be utilized for selecting and utilizing multiple recognizers to process an utterance based on a markup language document, in accordance with various embodiments.

Referring now to FIG. 2, the following discussion is intended to provide a brief, general description of a suitable computing environment in which various illustrative embodiments may be implemented. While various embodiments will be described in the general context of program modules that execute in conjunction with program modules that run on an operating system on a computing device, those skilled in the art will recognize that the various embodiments may also be implemented in combination with other types of computer systems and program modules.

Generally, program modules include routines, programs, components, data structures, and other types of structures that perform particular tasks or implement particular abstract data types. Moreover, those skilled in the art will appreciate that the various embodiments may be practiced with a number of computer system configurations, including hand-held devices, multiprocessor systems, microprocessor-based or programmable consumer electronics, minicomputers, mainframe computers, and the like. The various embodiments may also be practiced in distributed computing environments where tasks are performed by remote processing devices that are linked through a communications network. In a distributed computing environment, program modules may be located in both local and remote memory storage devices.

FIG. 2 shows the client computing device 2 which may include a mobile or portable computer or other type of computer capable of executing one or more application programs including, but not limited to, a laptop computer, a "smartphone" (i.e., a mobile phone having computer functionality and/or which is capable of running operating system software to provide a standardized interface and platform for application developers), and an automobile-based computing device. The client computing device 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The client computing device 2 further includes a mass storage device 14 for storing an operating system 32, the speech recognition service applications 30, the event handler application 38, the recognizer 40, the utterance 42, the markup language document 44, the results sets 46, the device interface applications 50, and the synchronization applications 60. It will be appreciated by those skilled in the art that the, in addition to being implemented as software residing on the mass storage device 14, the recognizer 40 may also be implemented completely in hardware. For example, the recognizer 40 may be implemented as a single chip CMOS voice recognition LSI circuit having voice analysis, recognition process and system control functions.

In accordance with various embodiments, the operating system 32 may be suitable for controlling the operation of a networked personal computer, such as the WINDOWS operating systems from MICROSOFT CORPORATION of Redmond, Wash. The mass storage device 14 is connected to the CPU 8 through a mass storage controller (not shown) connected to the bus 10. The mass storage device 14 and its associated computer-readable media provide non-volatile storage for the client computing device 2. Although the description of computer-readable media contained herein refers to a mass storage device, such as a hard disk or CD-ROM drive, it should be appreciated by those skilled in the art that computer-readable media can be any available media that can be accessed or utilized by the client computing device 2. By way of example, and not limitation, computer-readable media may comprise computer storage media and communication media.

Computer storage media includes volatile and non-volatile, removable and non-removable hardware storage media implemented in any physical method or technology for the storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, which can be used to store the desired information and which can be accessed by the client computing device 2. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as a computer program product.

According to various embodiments of the invention, the client computing device 2 may operate in a networked environment using logical connections to remote computers through the network 4 which, as discussed above, may include a local network or a wide area network (e.g., the Internet). The client computing device 2 may connect to the network 4 through a network interface unit 16 connected to the bus 10. It should be appreciated that the network interface unit 16 may also be utilized to connect to other types of networks and remote computing systems. The client computing device 2 may also include an input/output controller 22 for receiving and processing input from a number of input types, including a microphone 80 as well as a keyboard, mouse, pen, stylus, finger, and/or other means (not shown). Similarly, an input/output controller 22 may provide output to a display device 82 as well as a printer, or other type of output device (not shown).

Figure 3:
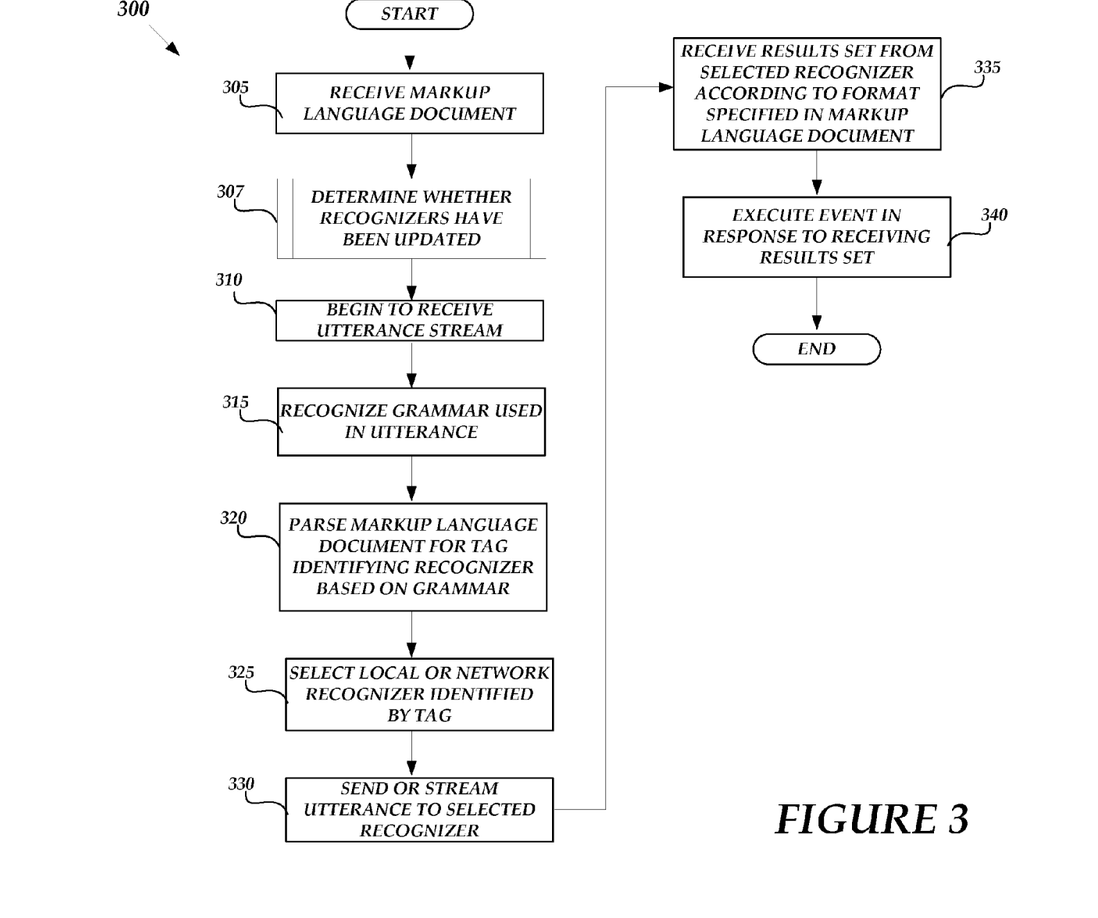
FIG. 3 is a flow diagram illustrating a routine for selecting and utilizing multiple recognizers to process an utterance based on a markup language document, in accordance with various embodiments.

FIG. 3 is a flow diagram illustrating a routine 300 for selecting and utilizing multiple recognizers to process an utterance based on a markup language document, in accordance with various embodiments. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIGS. 3-4 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 300 begins at operation 305, where a markup language document (e.g., the markup language document 44) is received by the client computing device 2. In one embodiment, the markup language document may be received via a request made to the network server 70 by the event handler application 38.

From operation 305, the routine 300 continues to operation 307, where the event handler application 38 determines whether any recognizers specified in the received markup language document 44 have been updated. A routine for determining updated recognizers will be described in greater detail below in the discussion of FIG. 4.

From operation 307, the routine 300 continues to operation 310, where the event handler application 38 executing on the client computing device 2 begins receiving an utterance (e.g., the utterance 42) as a stream from a user. It should be understood that, in accordance with various embodiments, the entire utterance 42 does not need to be received from the user. In particular, the utterance 42 may be streamed to the event handler application 38 for grammar recognition as the user is speaking into the client computing device 2. For example, a user of the client computing device 2 may utilize one or more of the speech recognition service applications 40 in conjunction with the event handler application 38 to make an utterance comprising a query for a contact to call via voice activated dialing or for the location of a business enterprise, traffic information, directions, weather information, or movie information by speaking into the microphone 80 (shown in FIG. 2).

From operation 310, the routine 300 continues to operation 315, where the event handler application 38 recognizes the grammar used in the utterance 42 received at operation 310. In particular, the event handler application 38 may be configured to perform speech processing to recognize the grammar (i.e., words) spoken in the utterance. In accordance with an embodiment, the event handler application 38 may utilize the recognized grammar in conjunction with the markup language document 44 to determine a recognizer (i.e., a local or network recognizer) for providing results for the utterance.

From operation 315, the routine 300 continues to operation 320, where the event handler application 38 parses the markup language document 44 for a markup language tag identifying a recognizer for processing the utterance based on the grammar recognized at operation 315. In particular, the event handler application 38 may be configured to parse the markup language in the markup language document 44 for a <grammar> markup language tag which may identify a local or network (e.g., via a universal resource locator ("URL")) from which to retrieve a stored grammar for comparing to the grammar recognized from the utterance 42 at operation 315.

From operation 320, the routine 300 continues to operation 325, where the event handler application 38 selects either a local recognizer (i.e., the recognizer 40) or a network recognizer (i.e., the recognizer 72) identified by a markup language tag in the markup language document 44. In particular, the event handler application 38 may select the recognizer which is associated with a grammar for returning results for the received utterance 42. For example, if the utterance 42 comprises a request for voice activated dialing of a contact contained in an address book stored on the client computing device 2, the event handler application 38 may select the (local) recognizer 40 which is identified in the markup language document 44 as being associated with a grammar including address book contacts for the client computing device 2. On the other hand, if the utterance 42 comprises a request for a local business search, the event handler application 38 may select the (network) recognizer 72 which is identified in the markup language document 44 as being associated with a grammar including business search information which may be retrieved via a query from the network server 70 to a remote web search engine.

From operation 325, the routine 300 continues to operation 330, where the event handler application 38 sends or streams the utterance 42 to the selected recognizer (e.g., the recognizer 40 or the recognizer 72). Once the utterance 42 is received by the selected recognizer, the utterance may be processed for results.

From operation 330, the routine 300 continues to operation 335, where the event handler application 38 receives one or more results sets from the selected recognizer according to a format specified in the markup language document 44. In particular, the recognizers 40 and 72 may be configured to return results sets for the utterance 42 in an unprocessed or "raw" format or a processed format, in accordance with various embodiments. Unprocessed recognizer results may include one or more terms comprising speech recognition of the utterance 42 by the recognizer 40 or the recognizer 72. On the other hand, processed recognizer results may include speech recognition of one or more terms associated with the utterance 42. For example, unprocessed results for an utterance comprising the term "coffee" may include the term coffee along with a confidence score assigned by the recognizer indicating the accuracy of the speech recognition for the utterance (e.g., 80%). On the other hand, processed results for an utterance comprising the term "coffee" may include business search results including the names and addresses of local businesses which sell coffee. The markup language document 44 may include markup language tags which identify the format in which results sets for the utterance are returned.

From operation 335, the routine 300 continues to operation 340, where the event handler application 38 executes an event in response to receiving the one or more results sets from the selected recognizer. The event may include a number of actions including, but not limited to displaying one or more results sets to a user of the client computing device 2 (e.g., on the display device 82), performing a voice-activated dialing function based on a results set, ignoring a results set, and combining a results set with previously received results sets for display on the client computing device 2. In accordance with an embodiment, multiple results sets may be displayed in a tabbed user interface (not shown) in which each tab is associated with a result set. The user interface may also include a drilldown list with displayed categories associated with each result set or a list sorted by the result type. The event handler application 38 may be configured to determine how the received results are processed (i.e., determine which action to take) based on a number of criteria including, but not limited to, the number of results in a results set, a confidence score for a results set, a return code for a results set (e.g., the return code may include an error code indicating that the network server 70 is down), and the presence of certain (i.e., predetermined) values for a results set. For example, the event handler application 38 may ignore a results set if the confidence score for recognizing an utterance is low (e.g., less than 50%) and thus prevent the results set from being displayed to a user of the client computing device 2. As another example, the event handler application 38 may generate and display an error dialog to a user of the client computing device 2 in response to receiving a return code for a results set which indicates that a server for processing results is down. As another example, the event handler application 38 may process predetermined values returned with a results set, the values representing the presentation of results to a user such as presenting the results set with a company logo or an advertisement. From operation 340, the routine 300 then ends.

Figure 4:
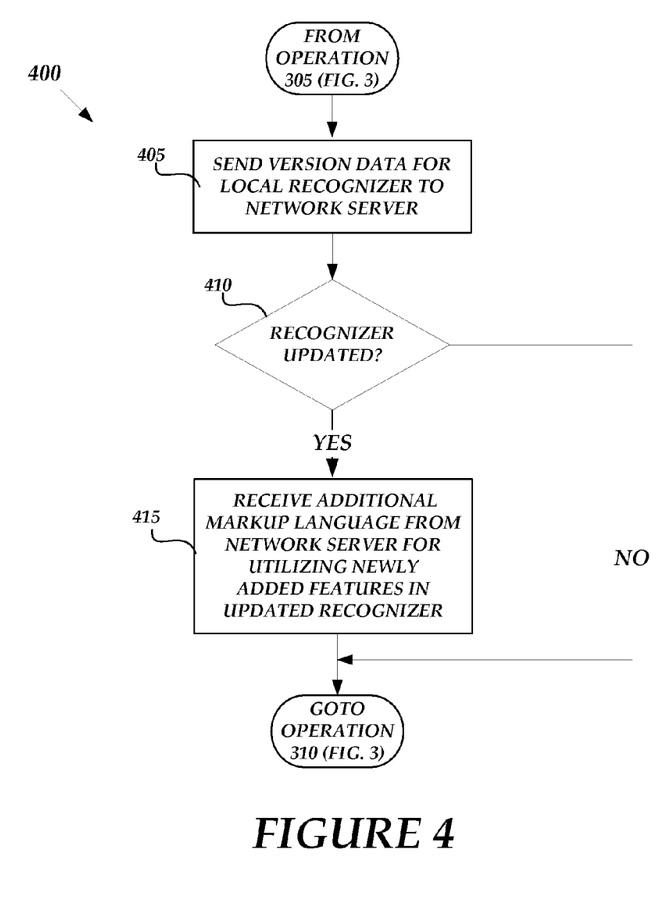
FIG. 4 is a flow diagram illustrating a routine for utilizing an updated recognizer for processing an utterance based on a markup language document, in accordance with various embodiments.

FIG. 4 is a flow diagram illustrating a routine 400 for utilizing an updated recognizer for processing an utterance based on a markup language document, in accordance with various embodiments. From operation 305 of FIG. 3 (discussed above), the routine 400 begins at operation 405, wherein the event handler application 38 sends version data for the (local) recognizer 40 from the client computing device 2 to the network server 70. As discussed above in the description of FIG. 1, the recognizer 40 may be in an operating system (i.e., the operating system 32) of the client computing device 2. It will be appreciated that when the recognizer is embedded in the operating system, the event handler application 38 may be configured to send the version of the operating system to the network server 70.

From operation 405, the routine 400 continues at operation 410, where the event handler application 38 determines whether the recognizer 40 has been updated on the client computing device 2 based on the version data. For example, for an embedded recognizer, the recognizer 40 may be updated after an operating system update on the client computing device 2.

If, at operation 410, the recognizer 40 has been updated (as determined by the network server 70 based on the received version data), then the routine 400 continues at operation 415, where the event handler application 38 receives additional markup language (i.e., the markup language document 74) from the network server 70. The markup language document 74 may include additional markup language tags for utilizing newly added features (such as voice-activated dialing, for example) in the updated version of the recognizer 40. The routine 400 then returns to operation 310 of FIG. 3. If, at operation 410, the recognizer has not been updated (as determined by the network server 70 based on the received version data), then the routine 400 also returns to operation 310 of FIG. 3.

Figure 5:
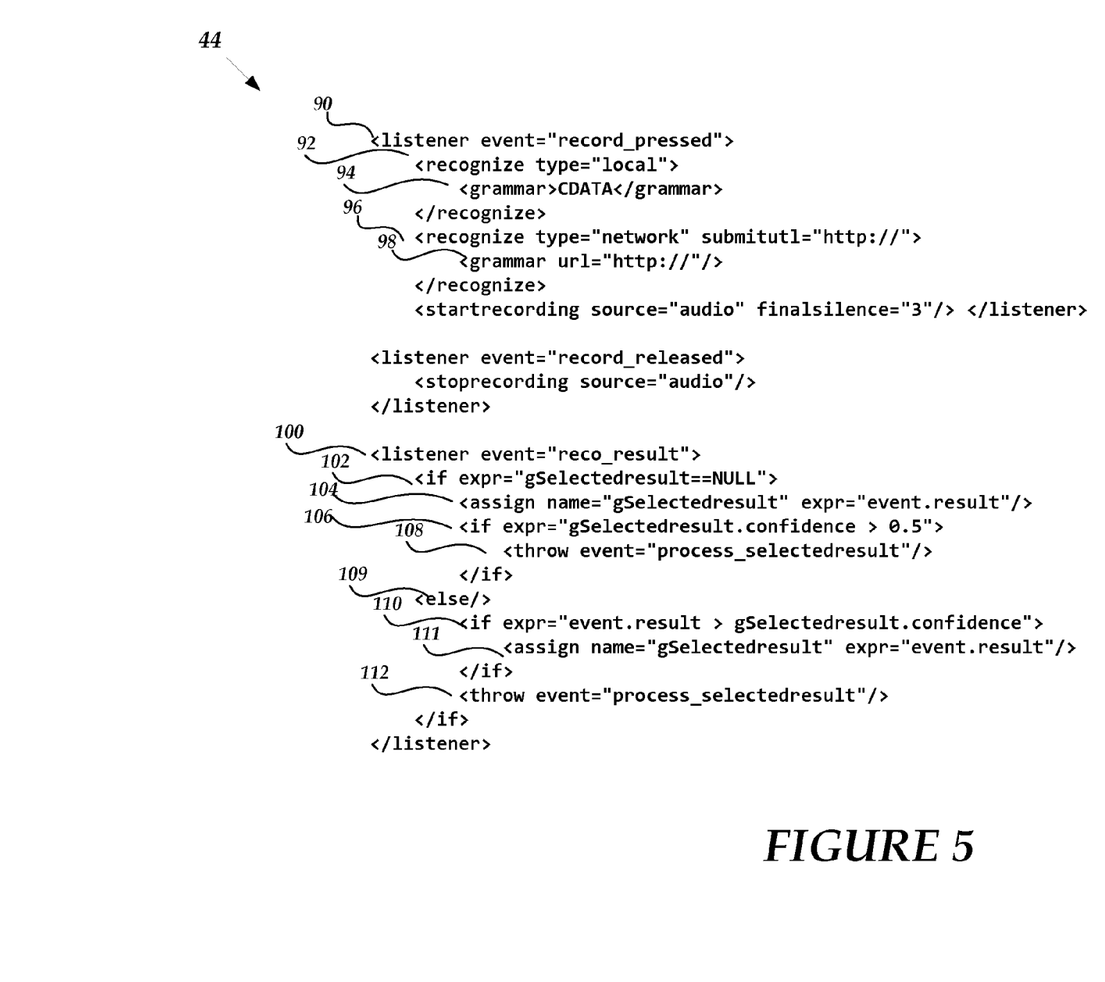
FIG. 5 shows a markup language document comprising tags which may be utilized to select from among multiple recognizers to process an utterance and to process results sets for the utterance, in accordance with various embodiments.

FIG. 5 shows a markup language document comprising tags which may be utilized to select from among multiple recognizers to process an utterance and to process results sets for the utterance, in accordance with various embodiments. In particular, FIG. 5 shows the markup language document 44 on the client computing device 2. The markup language document 44 includes a <listener> tag 90, a <recognize> tag 92, a <grammar> tag 94, a <recognize> tag 96, a <grammar> tag 98, a <listener> tag 100, an <if> tag 102, an <assign> tag 104, an <if> tag 106, a <throw event> tag 108, an <else/> tag 109, an <if> tag 110, an <assign> tag 111, and a <throw event> tag 112.

The <listener> tag 90 may be utilized by the event handler application 38 to receive the utterance 42 from a user of the client computing device 2. The <recognize> tag 92 includes a "type" attribute identifying a "local" recognizer. The <grammar> tag 94 includes a "url" attribute identifying an "http" address (i.e., a website address) for accessing a grammar used by the local recognizer. The <recognize> tag 96 includes a "type" attribute identifying a "network" recognizer. The <grammar> tag 98 includes a "url" attribute identifying an "http" address (i.e., a website address) for accessing a grammar used by the network recognizer. As discussed above with respect to FIG. 3, the event handler application 38 may parse the tags in the markup language document to identify a grammar used in an utterance and to select a recognizer to process an utterance based on the identified grammar.

As discussed above with respect to FIG. 3, the event handler application 38 may receive one or more results sets from the selected recognizer and process the one or more results set based on a confidence score. The <listener> tag 100 may be utilized by the event handler application 38 to receive the results set from the selected recognizer in response to the utterance. The tags 102, 104, 106, 108, 109, 110, and 111 may be utilized by the event handler application 38 to determine whether to use one or more results sets for executing an action on the client computing device 2 (e.g., <throw event="process_selectedresult"/> if a confidence score for recognizing the utterance is high (e.g., greater than 50%—"gSelectedresult.confidence>0.5") or whether to use a "null" results set if the confidence score for recognizing the utterance is low (e.g., <if expr="event.result>gSelectedresult.confience">, where the event result is a "null result.), and thus prevent the execution of an action with respect to the results set on the client computing device 2.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-implemented method for utilizing a plurality of recognizers to process an utterance based on a markup language document, comprising:

receiving the markup language document;

receiving the utterance;

selecting at least one of the plurality of recognizers for returning a results set for the utterance based on markup language in the markup language document, the at least one of the plurality of recognizers for returning the results set for the utterance being selected based on markup language in the markup language document, the selection based on the markup language further comprising:

recognizing a grammar used in the utterance;

parsing the markup language document for at least one markup language tag identifying at least one of the plurality of recognizers for returning the results set for the utterance based on the grammar; and selecting, by an event handler, the at least one of the plurality of recognizers identified by the at least one markup language tag, the selected at least one of the plurality of recognizers comprising a local recognizer embedded on a client computing device, when the grammar includes data stored on the client computing device, the selected at least one of the plurality of recognizers comprising a network recognizer on a network server, when the grammar includes data which is retrieved via a query from the network server to a remote search engine;

receiving the results set from the selected at least one of the plurality of recognizers in a format determined by a processing method specified in the markup language document; and executing an event in response to receiving the results set, the event comprising determining actions in response to receiving the results set, the actions being based on at least an assigned confidence score indicating an accuracy of a speech recognition for the utterance, the actions comprising ignoring the results set when the results sets comprises unprocessed results for the utterance and the confidence score is below a predetermined threshold, the actions further comprising preventing the results set from being displayed to a user.

2. The method of claim 1 further comprising:

sending version data for the at least one of the plurality of recognizers from a first computing device to a second computing device; and if the version data identifies an updated version for the at least one of the plurality of recognizers, then receiving additional markup language from the second computing device at the first computing device, the additional markup language comprising instructions for utilizing newly added features in the updated version.

3. The method of claim 1, wherein receiving the markup language document comprises at least one of receiving a locally stored markup language document on a client computing device and receiving a remotely stored markup language document from a network server on the client computing device.

4. The method of claim 1 further comprising at least one of sending and streaming the utterance to the selected at least one of the plurality of recognizers.

5. The method of claim 1, wherein receiving the results set from the selected at least one of the plurality of recognizers in a format determined by a processing method specified in the markup language document comprises receiving the results set in at least one of an unprocessed results format and a processed results format, wherein the unprocessed results format comprises one or more terms comprising a speech recognition of the utterance and wherein the processed results format comprises a speech recognition of one or more terms associated with the utterance.

6. A system for utilizing a plurality of recognizers to process an utterance based on a markup language document, the system comprising a client computing device, the client computing device comprising:
  a memory for storing executable program code; and
  a processor, functionally coupled to the memory, the processor being responsive to computer-executable instructions contained in the program code and operative:
    to receive the markup language document;
    to receive the utterance;
    to select at least one of the plurality of recognizers for returning a results set for the utterance based on markup language in the markup language document, the at least one of the plurality of recognizers for returning the results set for the utterance being selected based on markup language in the markup language document, the selection based on the markup language comprising:
      recognizing a grammar used in the utterance;
      parsing the markup language document for at least one markup language tag identifying at least one of the plurality of recognizers for returning the results set for the utterance based on the grammar; and
      selecting, by an event handler, the at least one of the plurality of recognizers identified by the at least one markup language tag, the selected at least one of the plurality of recognizers comprising a local recognizer embedded on a client computing device, when the grammar includes data stored on the client computing device, the selected at least one of the plurality of recognizers comprising a network recognizer on a network server, when the grammar includes data which is retrieved via a query from the network server to a remote search engine;
    to receive the results set from the selected at least one of the plurality of recognizers in a format determined by a processing method specified in the markup language document; and
    to execute an event in response to receiving the results set, the event comprising determining actions in response to receiving the results set, the actions being based on at least an assigned confidence score indicating an accuracy of a speech recognition for the utterance, the actions comprising ignoring the results set when the results sets comprises unprocessed results for the utterance and the confidence score is below a predetermined threshold, the actions further comprising preventing the results set from being displayed to a user.

7. The system of claim 6, wherein the processor is further operative to:
  determine whether an updated version is available for at least one of the plurality of recognizers; and
  if an updated version is available for the at least one of the plurality of recognizers, then receive an updated markup language document comprising additional markup language for handling newly added features in the updated version.

8. The system of claim 6, wherein the markup language document comprises at least one of a locally stored markup language document on the client computing device and a remotely stored markup language document on the network server.

9. The system of claim 6, wherein the processor is further operative to send the utterance to the selected at least one of the plurality of recognizers.

10. The system of claim 6, wherein the results set from the selected at least one of the plurality of recognizers is received in a format determined by a processing method specified in the markup language document, wherein the format comprises at least one of an unprocessed results format and a processed results format, wherein the unprocessed results format comprises one or more terms comprising a speech recognition of the utterance and wherein the processed results format comprises one or more terms associated with a speech recognition of the utterance.

11. A computer-readable storage medium comprising computer executable instructions which, when executed on a computer, will cause the computer to perform a method for utilizing a plurality of recognizers to process an utterance based on a markup language document, comprising:
  receiving the markup language document, wherein receiving the markup language document comprises at least one of receiving a locally stored markup language document on a client computing device and receiving a remotely stored markup language document from a network server on the client computing device;
  receiving the utterance;
  selecting at least one of the plurality of recognizers for returning a results set for the utterance based on markup language in the markup language document, wherein selecting at least one of the plurality of recognizers for returning a results set for the utterance based on markup language in the markup language document comprises:
    recognizing a grammar used in the utterance;
    parsing the markup language document for at least one markup language tag identifying at least one of the plurality of recognizers for returning the results set for the utterance based on the grammar; and
    selecting, by an event handler, the at least one of the plurality of recognizers identified by the at least one markup language tag, the selected at least one of the plurality of recognizers comprising a local recognizer embedded on a client computing device, when the grammar includes data stored on the client computing device, the selected at least one of the plurality of recognizers comprising a network recognizer on the network server, when the grammar includes data which is retrieved via a query from the network server to a remote search engine;
  streaming the utterance to the selected at least one of the plurality of recognizers;
  receiving the results set from the selected at least one of the plurality of recognizers in a format determined by a processing method specified in the markup language document; and
  executing an event in response to receiving the results set, the event comprising determining actions in response to receiving the results set, the actions being based on at least an assigned confidence score indicating an accuracy of a speech recognition for the utterance, the actions comprising ignoring the results set when the results sets comprises unprocessed results for the utterance and the confidence score is below a predetermined threshold, the actions further comprising preventing the results set from being displayed to a user.

12. The computer-readable storage medium of claim 11 further comprising:
  determining whether an updated version is available for at least one of the plurality of recognizers; and
  if an updated version is available for the at least one of the plurality of recognizers, then receiving an updated markup language document comprising additional markup language for handling newly added features in the updated version.

13. The computer-readable storage medium of claim 11, wherein receiving the results set from the selected at least one of the plurality of recognizers in a format determined by a processing method specified in the markup language document comprises receiving the results set in at least one of an unprocessed results format and a processed results format, wherein the unprocessed results format comprises one or more terms comprising a speech recognition of the utterance and wherein the processed results format comprises a speech recognition of one or more terms associated with the utterance.

* * * * *